Feb. 22, 1938.  M. G. MARKLE ET AL  2,109,136
ATOMIZING TYPE OIL FOGGER
Filed Sept. 8, 1931  4 Sheets-Sheet 2

Inventors
Matthew G. Markle
Loren W. Tuttle
By Brown, Jackson, Boettcher & Dienner
Attys.

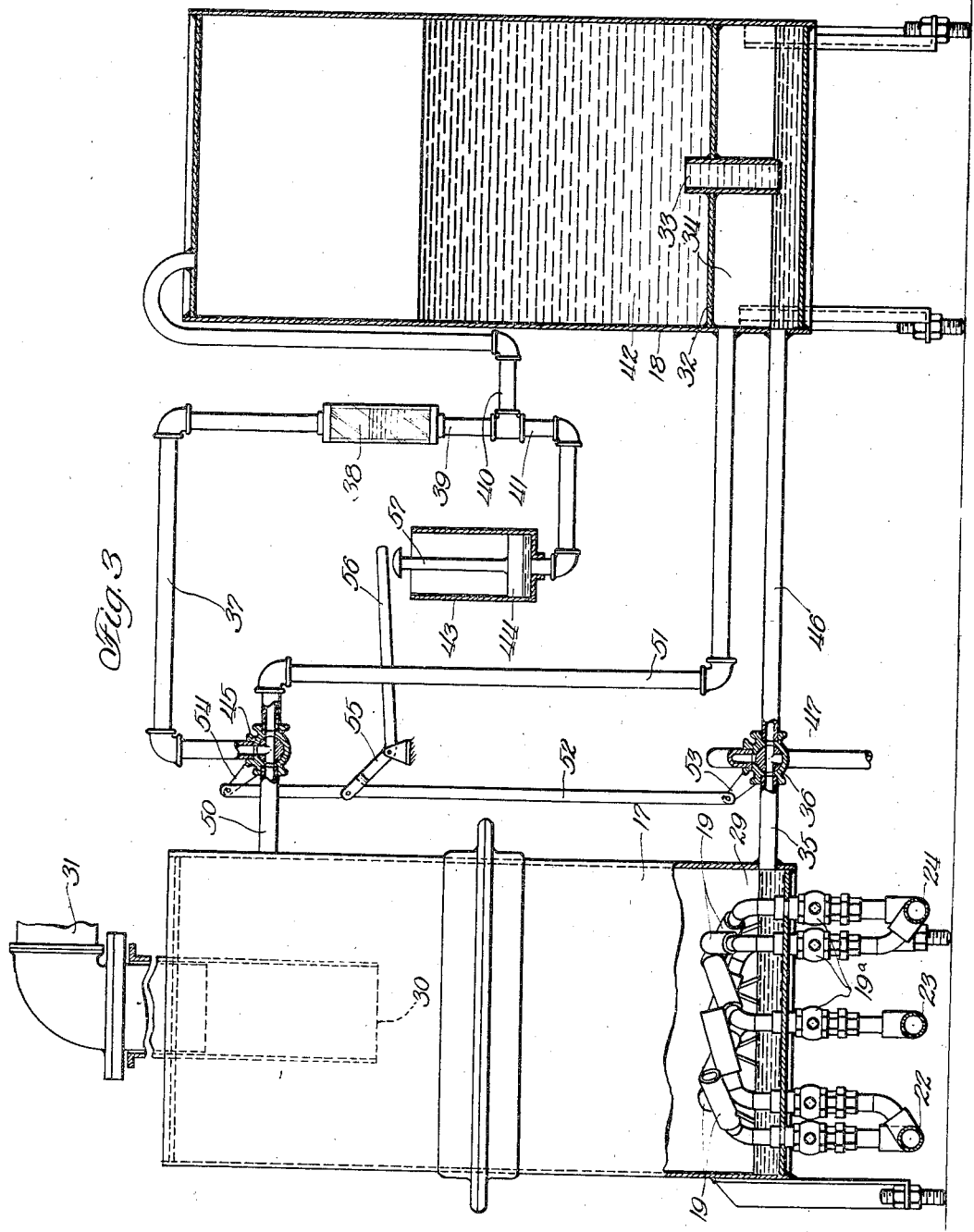

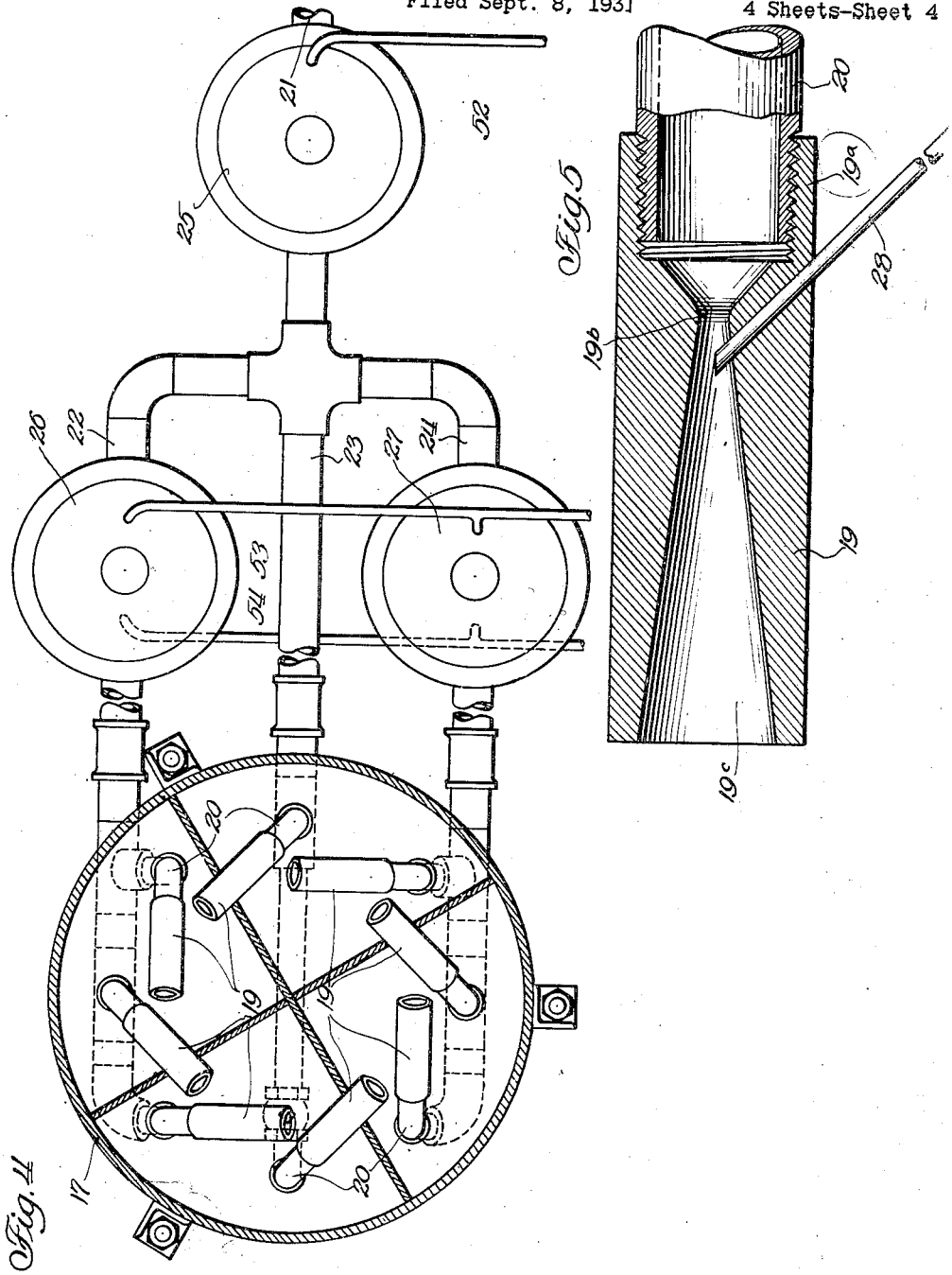

Patented Feb. 22, 1938

2,109,136

UNITED STATES PATENT OFFICE 2,109,136

ATOMIZING TYPE OIL FOGGER

Matthew G. Markle, Lake Bluff, and Loren W. Tuttle, Mount Prospect, Ill.

Application September 8, 1931, Serial No. 561,629

1 Claim. (Cl. 48—190)

Our invention relates to a method of and means for fogging gas.

Combustible gas for fuel and illumination is widely distributed through pipe lines and conduits provided with expansion joints, valves, cocks and the like where there is opportunity for leakage to occur. It has long been known that if the packing and surfaces of such fittings are kept wet with oil or an oily liquid, the leakage can be greatly reduced if not substantially eliminated.

In artificial gas the process of manufacture provides or can readily provide the necessary amount of sealing liquid to be carried by the gas for thus sealing the minute openings which would otherwise pass gas and thereby permit leakage.

Natural gas, the distribution of which from remote fields and over wide areas is now rapidly progressing, is very dry. Other dry gases besides natural gas have the same tendency. It contains no appreciable amount of oil or like liquid and in fact it not only fails to supply the desired liquid seal or lubricant, but actually tends to dry it up wherever provided. As a result, it has been found necessary to provide the desired liquid content by injecting into the gas finely divided oil preferably in the shape of a so-called oil fog to make up for the lack of water as well as oil in these dry gases.

It is desirable that the oil so introduced be carried along with the gas to relatively great distances so that it will wet or lubricate the fittings such as cocks, valves, etc. at all points in the system to keep the same tight. Any excess oil fog which does not deposit upon the surfaces desired merely passes on with the gas into the burners and is consumed. It has been attempted heretofore to form a suitable oil fog, but so far as we have been able to ascertain the means and methods heretofore employed have been expensive and wasteful.

There are a number of reasons for this which will more plainly appear from the following specification describing the construction and practice of our invention, but chief among these reasons, as we believe, is that previous oil foggers have proceeded upon the theory of forming the fog from hot oil, or form and utilize the same in such manner as not to secure the full benefit of the thermodynamic action. We provide what we conceive to be a far superior method of forming the fog in that we form the fog cold and throw it into a warmer current of gas, or at least into a current of gas not substantially colder. We are not able to say with certainty just what the full explanation of the persistence of our fog is, but we submit the following as our present theory of the action involved:—

We conceive that the size of a particle of liquid which will be carried a certain distance in a stream of gas of a given composition moving at a certain velocity is substantially fixed. If the temperature of the gas drops, the size of the liquid particles does not change appreciably, but the drops approach each other more closely because of the shrinkage of the body of gas. Also, if any of the oil in vapor form is present, it tends to condense upon the particles in liquid form. Hence, we conceive that formation of the fog hot and subsequent chilling of the same is unfavorable to a maximum of persistence. Our experiments and observations confirm this theory.

According to our process, the fog is formed cold and is introduced into the gas which is preferably at a temperature higher than that of the fog.

There are a number of practical advantages flowing from this mode of operation. First, there is no necessity for applying heat. This avoids expense of apparatus and heat, and avoids the difficulties of maintenance which heating apparatus entails. Second, due to the greater persistence of the fog, a higher economy of oil is secured and the effect is more far reaching.

The means which we employ involves a number of novel features, some of which are the following:—The fog producing nozzles are Venturi nozzles and serve not only to atomize the oil, but also, and this is important, serve to meter it in a fairly close proportion to the gas passing through the same.

The fogging chamber serves as a separating chamber to separate out any particles which are too large to be transported by the current of gas. This separation is performed partly by centrifugal separation and scrubbing against the walls of the chamber and also partly by gravity. We arrange to produce a less or greater separating action by adjusting the position in the chamber where the outlet is located.

In order to secure the necessary pressure difference to develop an atomizing effect, we dispose the oil fogger in shunt of a pressure reducing valve so that from 3 to 5 pounds pressure difference is available. Obviously our invention is not dependent upon use of the fogger at this particular location, but important practical advantages are thereby secured. It may be desirable to introduce fog as a point where no pressure reduction is made. In that case means such as a pump may be employed to make the necessary pressure difference to secure proper atomization.

It is not desirable to force all the gas to pass through the fogger because of the size of the unit which would be required. By forming the fog with a part of the gas and delivering the fog into the main stream of gas, it is possible to keep the apparatus small in size and at the same time the advantage of delivering the fog cold into a slightly warmer body of gas is readily attainable. The main flow of gas passes through the main pressure regulator where it expands from a suitable transmission pressure to a suitable distribution pressure, but with no substantial change in temperature. The fogging stream of gas which is always proportional to the main stream does the work of atomizing the liquid and suffers an appreciable drop in temperature. The two streams unite and carry a highly persistent fog.

Another feature of our invention resides in the provision of means for keeping a substantially constant level of oil in the fogging chamber. The fogging chamber contains in its lower end a body of oil from which the nozzles draw oil for atomization and into which the larger particles thrown out by the separating action are returned. A further feature of novelty resides in the supply means for maintaining the desired oil level and the means for recharging said supply means with oil.

The oil fogging unit may be located anywhere in the system where a pressure difference of from 3 to 5 pounds or more is available.

Other objects and advantages will be apparent from a consideration of the following specification and accompanying drawings wherein:

Figure 3 is an enlarged diagrammatic elevation of the atomizing chamber and oil supply tank and oil feed regulating and charging connections.

Figure 4 is a horizontal sectional view of the atomizing chamber and associated gas pressure regulators.

Figure 5 is a longitudinal sectional view of an atomizing nozzle.

Figure 1:
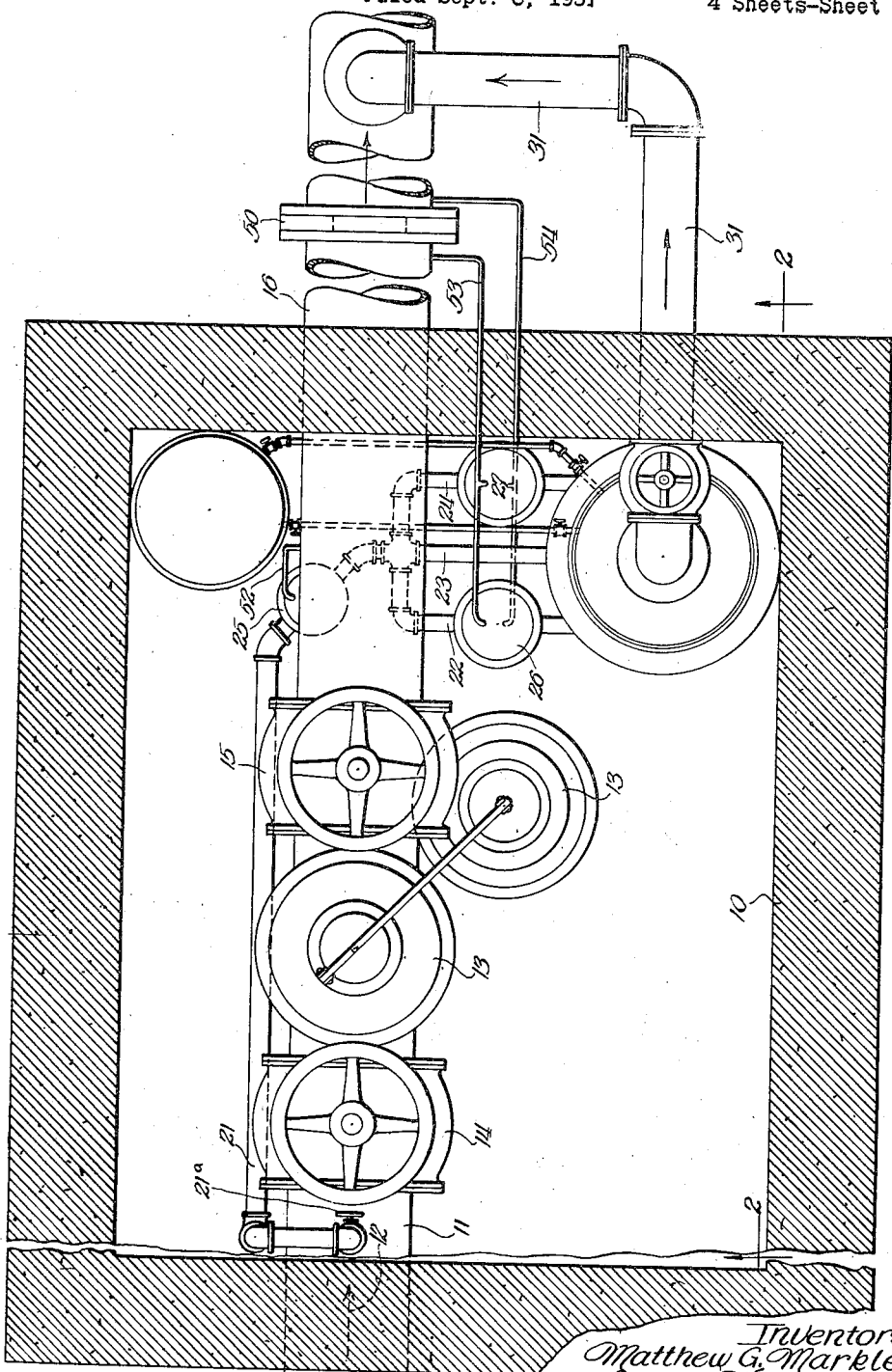
Figure 1 is a top plan view of a fogging station embodying the present improvements and by means of which the improved method can be carried out.
Figure 2:
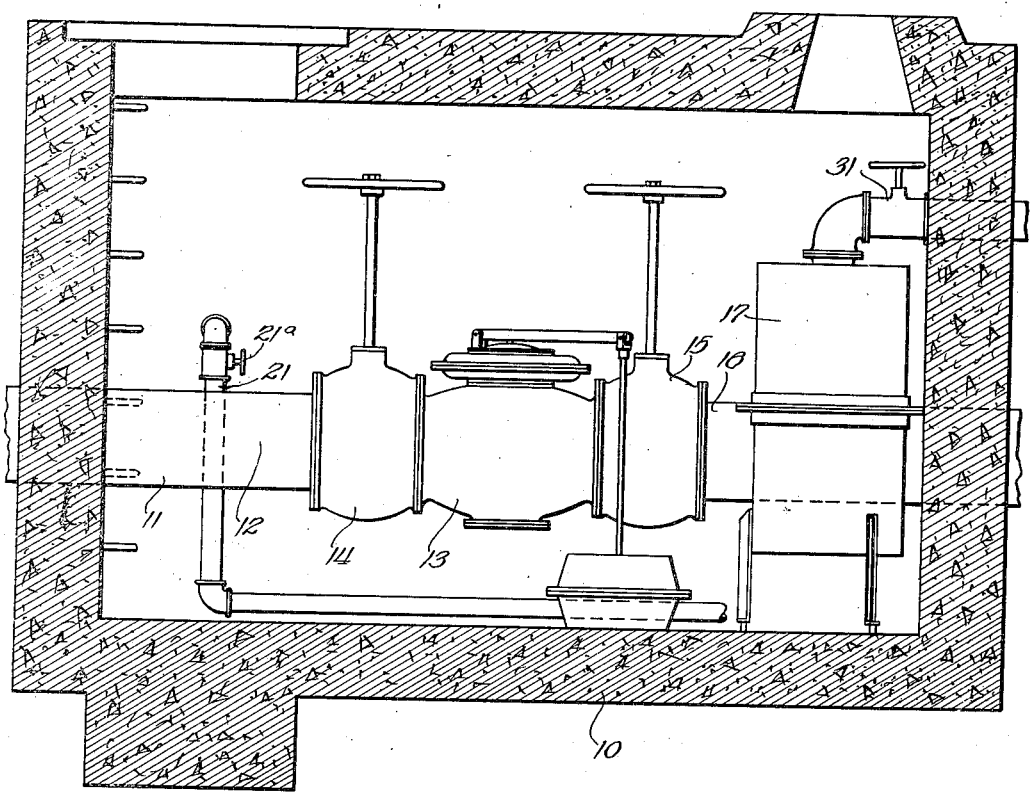
Figure 2 is a vertical sectional view taken on line 2—2 of Figure 1.
Figure 6:
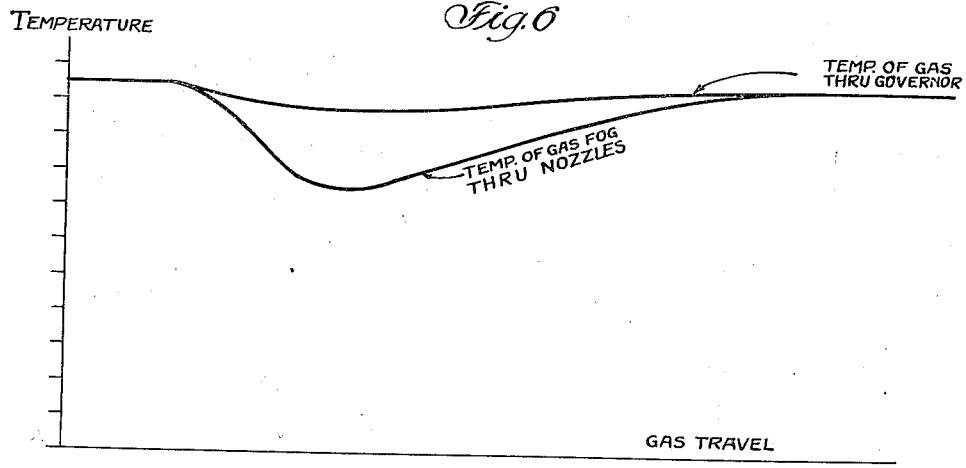
Figure 6 is a graph illustrating, in a general way, the relative temperature of the gas after passing through the gas regulators with reference to the temperature of the gas fog after passing through the atomizing nozzles.

Gas to be conveyed a substantial distance is transmitted under considerable pressure for obvious reasons, and pressure reducing valves are required for reducing the pressure as the gas passes from a main to a lower pressure section of the system, such as the distribution network that leads to the customer's outlets. Such pressure reducing valves are automatic in action and generally are placed in manholes or vaults built in the ground at a proper depth. In the drawings such a structure is indicated at 10, and passing through the same is a gas conduit 11, the high pressure side being at the bottom of the figure. The gas flows in the direction indicated by the arrow 12 and passes through the automatic pressure reducing valve or regulator 13 of conventional construction. Manually operable valves 14 and 15 generally are provided for use as may be required. The gas after passing through the valve 13 enters pipe 16 at suitably reduced pressure. The drop in pressure from the higher pressure side to the lower pressure side may be any usual or preferred amount, but should, in the present construction, be at least 3 to 5 pounds per square inch. The pressure on the gas consumption outlets connected to pipe 16 is of the order of 6 inches of water.

The fogging apparatus of the present improvements may suitably be installed in manholes of the type mentioned or in any desired location. The apparatus comprises an atomizing tank 17 and oil reservoir 18 and associated parts. The tank 17 as shown is provided with a plurality of atomizing nozzles 19 which are connected through suitably shaped elbows 20 to fittings passing through and fixed to the floor of the tank. The nozzles 19 preferably are disposed at an angle to the horizontal, as shown in Figure 3, and also at angles with respect to the radii of the base of the cylindrical tank 17 as illustrated in Figure 4 to give the discharge from the nozzles a helical upward travel within the tank 17.

The pipe 21 which forms a by-pass about the main pressure reducing valve 13, conveys gas from the higher pressure conduit 11 to a manifold having branch pipes or headers 22, 23 and 24 as illustrated in Figure 4.

The gas flowing through pipe 21 is utilized in the nozzles 19 for atomizing the oil and for carrying the oil fog thus formed into the low pressure main through the pipe 31.

Between the pressure regulator 13 and the low pressure main where the pipe 31 joins the same, we have introduced a fitting, including an orifice plate 50 as shown in Figure 1. The function of the orifice plate is to provide a pressure difference having a definite relation to the gas flow through that part of the main flow which is later joined by the stream of fog carrying gas. It is desirable that the flow of gas through the by-pass 21, tank 17 and pipe 31 should be proportional to the flow through the orifice plate 50, so that the amount of fog is proportional to the total amount of gas flow. It will be observed the entire flow of gas through the pipe 21 passes through a diaphragm control valve 25, and then joins the manifold to which pipes 22, 23 and 24 are connected. The valve 25 is a shut-off valve which is operated by a diaphragm to shut off the flow of gas through the pipe 21 when the pressure on the delivery side of the regulator exceeds a predetermined value. We have shown the diaphragm chamber of this valve 25 as connected to the low pressure main 16 through the connection 52. The flow of gas through the fogging unit through the pipe 21 and the branch pipe 23 and the two nozzles connected thereto is designed to be sufficient to supply the night time load. If, however, the feed through the pipe 21 should be so excessive as to increase the pressure in the main 16 above predetermined value, this pressure acting through the connection 52 and the diaphragm chamber of the valve 25 shuts off the by-pass 21, stopping further operation of the fogging device or the flow of gas through said by-pass 21.

The diaphragm chambers of valves 26 and 27 are connected by suitable pipes 53 and 54 to the opposite sides of the orifice plate 50. The valve 26 is designed to open with a snap action at a suitable pressure difference corresponding to a definite flow through the pipe 16. Similarly, the valve 27 is designed to open with a snap action for a higher pressure difference corresponding to higher flow at pipe 16. Thus the number of nozzles which are active to form fog are proportioned roughly, or approximately, to the flow of gas through the orifice plate 50.

The valves 25, 26, and 27 are snap action valves, that is, close and open sharply, inasmuch as no throttling action upon the nozzles is desired, full pressure of the gas being necessary for proper atomizing operation of these nozzles.

When higher pressures are available so that atomizing is effective even if throttling is practiced, these valves may be made of the throttling type to control the flow of gas through the fogging unit in proportion to the flow through the main gas flow.

The nozzles 19, as shown in Figure 5, may each comprise a threaded socket by means of which it is secured to the fitting or pipe nipple 20. The type of nozzle illustrated in Figure 5 is a Venturi nozzle which has a longitudinal passage which, at 19*b*, is constricted to form a throat while the remainder of the passage 19*c* increases in cross-section to the outer end of the nozzle.

Extending through the wall of each nozzle 19 is an oil feed tube 28, the inner end of which projects into the passage 19*c* a short distance beyond the constriction 19*b*. The outer or lower ends of the tubes 28 project beneath the surface of the oil 29 which is maintained in the bottom of the tank 17 at substantially a constant level.

The gas in passing through the nozzles 19 is accelerated in velocity by the constricted opening 19*b* with a consequent reduction in pressure, and this reduction in pressure draws oil through the tubes 28 and the velocity of the gas effects the atomization of the same. The angular disposition of the nozzles 19, as above described, results in the body of gas and oil fog within the tank being given a swirling or helical motion with the result that the larger particles of the oil mist are carried by centrifugal force toward and against the vertical wall of the tank to secure a so-called scrubbing action. Such heavier particles will coalesce or condense and drop to the bottom of the tank into the body of oil 29 or be thrown against the walls to which they adhere and down which the deposited liquid gravitates. This provides a direct return of the precipitated or separated oil without any separate return connections. Suitable baffles, as shown in plan view in Figure 4, may be provided to limit or prevent the swirling of the body of oil in the bottom of the tank by the whirling action of the gas therein.

The oil fog passes from the tank 17 preferably through a sleeve 30 which is vertically adjustable along the pipe 31. When the sleeve is in its highest position only such oil particles as are fine enough to be carried by the gas will pass through the pipe 31 into the lower pressure gas conduit 16 which conducts the gas to be treated with the oil fog. If a coarser quality of fog is desired, the sleeve may be lowered to limit the centrifugal scrubbing action.

As the gas and oil fog pass through the passages 19*c* of nozzles 19, the expansion of the gas results in a lowering of the temperature thereof in accordance with, first, the Joule-Thompson effect and, second, the laws of Boyle and Charles because of the loss of heat incident to the work done in atomizing the oil. This reduction in temperature of the gas and the oil particles below the temperature of the gas current flowing in the pipe 16 increases the capacity of the oil fog to persist longer in the form of small particles and thus travel a relatively greater distance within the gas system for the reason that upon the admission of the lower temperature oil fog into the gas stream in the pipe 16, the relatively higher temperature of the gas tends first to expand the gas carrying the fog, thereby separating the oil particles, and second, to evaporate oil from the surface of the oil particles. This latter action results in the oil particles being further reduced in size and to thereby become more easily carried, hence more persistent. In the oil fogging of gas as heretofore carried on, insofar as we are aware, the oil particles of the fog are not so reduced in temperature at the point of admission into the gas stream as to secure any appreciable beneficial effect. If the oil particles are of a higher temperature than the gas stream, the body of gas carrying the particles upon contact with the colder main stream of gas will contract and thus bring the particles closer together. Also, the chilling tends to condense any vapor upon the liquid particles, thereby increasing their size. The relative temperature of the gas passing through the governor or regulator and of the gas carrying the fog are illustrated in Figure 6.

Another feature of the present invention which assists in effecting the improved results is that there are no pipe connections at the outlets of the nozzles 19 to prevent or limit the full expansion of the gas and oil fog or to effect a scrubbing action on the oil and cause the particles to coalesce. The freedom of the fog to expand upon leaving the nozzles, the separation of the larger from the finer particles and the conveying of the latter to the main gas stream at a reduced temperature results in the more persistent fogging of the gas.

As mentioned above, the sleeve 30 can be adjusted vertically. When the sleeve is in its highest position only the lightest or finest oil particles will be passed from the tank 17, whereas if the sleeve is lowered fog comprising larger oil particles can be conducted into the gas stream. The sleeve 30 is merely an illustration of means for varying the character of the fog that is conveyed to the gas stream.

The flow of gas to the nozzles 19 may be controlled by any suitable means, as by individual shut-off valves 19*a* beneath the tank 17 or by a valve 21*a* in pipe 21. The atomization of the oil may also be controlled automatically if desired, as by diaphragm valves which are responsive to pressure variations in the outlet pipe 16 of the governor or regulator 13, or the nozzles may be turned off and/or on by hand or by clock mechanism according to a time schedule.

It is desirable to maintain the supply of oil 29 in the tank 17 substantially constant and for effecting this object constant level supply apparatus is shown in detail in Figure 3. The reservoir oil tank 18 has a transverse partition or false bottom 32 therein through which a short tube 33 projects into the constant level chamber 34. A connection comprising pipe 35, valve 36 and pipe 46 connects the chamber 34 with the tank 17 and when the three way valve 36 is in the position shown in Figure 3, oil can flow to the tank 17 to compensate for the oil which passes out as fog and maintain in chamber 17 the same oil level as prevails in chamber 34. A pipe 50 extends from the upper part of tank 17 to valve 45 which in normal position connects pipe 50 to pipe 37 and this in turn extends to a mercury seal and indicator 38 which in turn is connected to a short pipe 39. Extending from the pipe 39 are branches 40 and 41, the former of which extends to the top of the reservoir 18. The branch 41 communicates with a mercury displacing device, which in the form illustrated, comprises a cylinder 43 provided with a manually operable piston 44. The three-way valve 45 has a pipe connection 51 to the top of chamber 34 which, when the valve 45 is in the position shown in Figure 3, permits gas pressures on the liquid in the bottom parts of tanks 17 and 34 to equalize, and permits gas to pass up the nipple 33 to take the place of liquid flowing down. The pipe 35 is connected to a three-way valve 36 from which extends the pipe 46 which communicates with the chamber 34 of the tank 18 at a point below the level of the oil contained therein as shown in Figure 3. When the valves 36 and 45 and the piston 44 are in the position shown, oil from chamber 34 can flow through pipes 46 and 35 to the tank 17 to maintain the oil therein at the proper level, the connection through pipes 51 and 50 serving to equalize the pressures in the chamber 34 and tank 17. The supply device constitutes a constant level maintaining feed of the bird fountain or Mariott bottle type. When the oil in the chamber 34 drops below the end of the tube 33, gas flows up through the neck 33 permitting additional oil to enter the chamber through the tube from the main body of oil 42. The mercury seal is gas tight and prevents admission of air or gas which tends to enter through the pipe 40 as the top of the tank 18 is normally under suction. The level of oil in the chamber 34 and tank 17 is thus kept substantially even with the lower end of neck 33. The lowering of the oil in tank 18 allows the pressure therein to rise and hence exert less pressure difference on the mercury seal, one leg of which serves as an indicator in the glass 38.

The two valves 36 and 45 are connected for joint operation as by the bar or link 52 which connects the operating arms or cranks 53 and 54 of the valves 36 and 45, respectively. A common actuating member in the shape of a bell crank lever 55 having an operating handle 56 is adapted to actuate both valves in unison. This handle 56 interlocks with the handle 57 of piston 44. Hence the valves 36 and 45 must be turned through such movement as will shift them to charging position—in this case 90°— before the handle 57 of the pump plunger can be raised. Similarly the plunger handle 57 must be depressed before the lever 56 can be swung down to shift the valves to normal position.

To recharge the reservoir or tank 18 with oil, valve 45 is turned 90 degrees counterclockwise to maintain communication of pipe 37 with the tank 17 and to close off the pipe 51. The valve 36 is at the same time likewise turned counterclockwise 90° from the position shown and thus establishes communication between an oil pressure supply line 47 and the pipe 46. The valve 36 in the latter position cuts off communication with the tank 17. The piston 44 is then elevated to draw the mercury of the seal into the cylinder or cup 43. Oil from the pressure line 47 is forced through pipe 46 into the chamber 34 and through tube 33 into the reservoir, compression of gas in the upper part of the tank 18 being relieved through pipes 40, 39, 38, 37 and 50 and tank 17. The upper end of the pipe 51 being closed by the valve 45, oil does not enter said pipe, and the portion of the chamber 34 above the level of the lower end of the tube 33 is likewise kept free of oil by the entrapped gas. The tank 18 preferably has all its seams and joints welded and the various pipes entering the same may also be welded to the tank to prevent entrance of air into the tank 18 and thus avoid flooding the tank 17 with oil.

By the present improvements satisfactory fogging can be effected with a pressure differential on the nozzles of only 3 to 5 pounds. With a greater differential the efficiency of the apparatus is increased. It will be seen that no moving parts are employed in effecting the atomization of the oil, no heat is used, and the power employed is obtained from the pressure of the gas conveyed to the nozzles.

The fog formed by the present improvements has been found to be very persistent, affording adequate oiling of parts at a distance of five thousand feet from the fogging station even when used in conjunction with a low pressure distribution system.

It will be apparent that the apparatus described is not limited to the use of oil only, as other liquids may be similarly atomized, if desired, either for treating gas or for analogous purposes. It will also be apparent that the reduction of the temperature of the fog may be effected or amplified by methods or apparatus other than as described above, and also that the relative raising of the temperature of the gas, instead of a reduction in temperature of the fog, is within the scope and spirit of our invention.

We claim:—

A method of fogging a flow of gas as it passes from a transmission conduit to a distribution conduit, which comprises reducing the pressure of so much gas as is required to supply the demand upon the distribution system, dividing the flow into two streams, a main stream and a fogging stream, reducing the pressure of the main stream substantially without doing external work, reducing the pressure of the fogging stream and simultaneously bringing said fogging stream at high velocity into atomizing contact with a stream of fogging oil to load said latter gas stream with oil fog, providing for relatively free expansion of said high velocity flow during atomization to prevent impingement and agglomeration of said fog particles, and maintaining the level of the fogging oil substantially constant whereby said high velocity flow lifts the oil a relatively small but constant distance so that minimum energy of flow is employed in lifting the oil.

MATTHEW G. MARKLE.
LOREN W. TUTTLE.